United States Patent
Date

(10) Patent No.: US 9,322,147 B2
(45) Date of Patent: Apr. 26, 2016

(54) INFORMATION DISPLAY DEVICE OF CONSTRUCTION MACHINE, INFORMATION DISPLAY METHOD OF CONSTRUCTION MACHINE, AND INFORMATION DISPLAY COMPUTER PROGRAM OF CONSTRUCTION MACHINE

(75) Inventor: Kazuaki Date, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,087

(22) PCT Filed: Sep. 14, 2012

(86) PCT No.: PCT/JP2012/073726
§ 371 (c)(1),
(2), (4) Date: May 19, 2014

(87) PCT Pub. No.: WO2013/073281
PCT Pub. Date: May 23, 2013

(65) Prior Publication Data
US 2014/0257645 A1 Sep. 11, 2014

(30) Foreign Application Priority Data
Nov. 15, 2011 (JP) .................... 2011-249236

(51) Int. Cl.
G06F 7/70 (2006.01)
E02F 9/26 (2006.01)
B60K 35/00 (2006.01)
G07C 3/00 (2006.01)
B60K 37/02 (2006.01)
(Continued)

(52) U.S. Cl.
CPC . *E02F 9/26* (2013.01); *B60K 35/00* (2013.01); *B60K 37/02* (2013.01); *B60K 37/04* (2013.01); *B60K 37/06* (2013.01); *E02F 9/267* (2013.01); *G07C 3/00* (2013.01); *B60K 2350/1048* (2013.01); *B60K 2350/1072* (2013.01); *B60K 2350/941* (2013.01); *B60K 2350/946* (2013.01)

(58) Field of Classification Search
CPC ........ B60K 35/00; B60K 37/00; B60K 16/00; B60K 2350/1016
See application file for complete search history.

(56) References Cited

U.S. PATENT DOCUMENTS 7,228,505 B2 6/2007 Shimazu et al.
8,151,207 B2 4/2012 Shimazu et al.
(Continued)

FOREIGN PATENT DOCUMENTS

CN 1263577 A 8/2000
CN 1337504 A 2/2002
(Continued)

OTHER PUBLICATIONS

International Search Report mailed Dec. 25, 2012, issued for PCT/JP2012/073726.

*Primary Examiner* — Michael D Lang
(74) *Attorney, Agent, or Firm* — Locke Lord LLP

(57) ABSTRACT

An information display device includes a display device that is mounted in a construction machine and displays various types of information of the construction machine, and a control device that deletes a display of a guide mark guiding a function of a display change-over switch for changing information displayed on the display device in a screen on which at least information of a fuel amount and information of an engine water temperature are displayed when the construction machine is in the operation state.

14 Claims, 7 Drawing Sheets

(51) Int. Cl.
*B60K 37/04* (2006.01)
*B60K 37/06* (2006.01)

(56) References Cited

U.S. PATENT DOCUMENTS

| 2002/0015062 | A1 | 2/2002 | Shimazu et al. |
| 2002/0085043 | A1* | 7/2002 | Ribak ............ 345/810 |
| 2007/0171087 | A1 | 7/2007 | Shimazu et al. |

FOREIGN PATENT DOCUMENTS

| EP | 0990740 A1 | 4/2000 |
| EP | 0990740 B1 | 4/2000 |
| JP | 2000-328610 A | 11/2000 |
| JP | 2002-364453 A | 12/2002 |
| JP | 2006-016915 A | 1/2006 |
| JP | 2008-163674 A | 7/2008 |

* cited by examiner

INFORMATION DISPLAY DEVICE OF CONSTRUCTION MACHINE, INFORMATION DISPLAY METHOD OF CONSTRUCTION MACHINE, AND INFORMATION DISPLAY COMPUTER PROGRAM OF CONSTRUCTION MACHINE

FIELD

The present invention relates to a technique of causing various types of information of a construction machine to be displayed on a display device.

BACKGROUND

A cab of a construction machine such as bulldozers or excavator includes gauges displaying various types of information in order to cause a worker to view an operation status of a construction machine. In recent years, techniques of causing various types of information to be displayed on a display device such as a liquid crystal display (LCD) have been widely prevalent. There has been known a technique in which a switch for operating a screen when various types of information of a construction machine are displayed on a display device is installed near the display device (for example, Patent Literature 1).

CITATION LIST

Patent Literature

Patent Literature 1: Japanese Laid-open Patent Publication No. 2006-16915

SUMMARY

Technical Problem

In recent years, as functions of the construction machine are diversified, the amount of information desired to be delivered to the worker through the display device tends to increase. When the increased information is displayed on the display device as is, for example, an area which each piece of information occupies in the display device decreases, visibility is lowered. Particularly, information necessary when the construction machine is operated is required to be displayed on the display device by securing sufficient visibility.

An object of the present invention is to cause more information necessary when the construction machine is operated to be displayed on the display device while securing visibility of the display device.

Solution to Problem

According to the present invention, an information display device of a construction machine, comprises: a display device that is mounted in a construction machine and displays various types of information of the construction machine; and a control device that deletes a display of a guide mark guiding a function of a display change-over switch for changing information displayed on the display device in a screen on which at least information of a fuel amount and information of an engine water temperature are displayed when the construction machine is in an operation state.

In the present invention, it is preferable that when the display of the guide mark is deleted, an input to the display change-over switch is not received.

In the present invention, it is preferable that the control device causes information necessary when the construction machine is in the operation state to be displayed at a position of the deleted guide mark.

In the present invention, it is preferable that information displayed at the position of the guide mark deleted by the control device is information allocated to a mark in which a plurality of types of information are changed by the display change-over switch to be displayed.

In the present invention, it is preferable that when an error occurs in the construction machine while the construction machine is being operated, the control device displays the guide mark representing the display change-over switch for switching to a screen displaying information of the error.

In the present invention, it is preferable that when the construction machine is not in the operation state, the control device causes the guide mark to be displayed on the display device.

In the present invention, it is preferable that when there is an input to an operating lever for operating the construction machine, the control device deletes the display of the guide mark.

In the present invention, it is preferable that when a state in which the operating lever is at a neutral position is maintained during a predetermined period of time or less, the control device deletes the display of the guide mark.

According to the present invention, an information display device of a construction machine, comprises: a display device that is mounted in a construction machine and displays various types of information of the construction machine; a display change-over switch that changes information displayed on the display device; and a control device, wherein when the construction machine is in an operation state, the control device deletes a display of a guide mark which is displayed on an end portion of a screen of the display device and guides a function of the display change-over switch in a screen on which at least information of a fuel amount and information of an engine water temperature are displayed and causes information necessary when the construction machine is in the operation state to be displayed at a position of the deleted guide mark, and when the construction machine is not in the operation state, the control device causes the guide mark to be displayed on the display device, and when an error occurs in the construction machine while the construction machine is being operated, the control device displays the guide mark representing the display change-over switch for switching to a screen displaying information of the error, and, wherein, when the display of the guide mark is deleted, an input to the display change-over switch is not received.

According to the present invention, an information display method of a construction machine, comprises: determining whether or not a construction machine is in an operation state; deleting a display of a guide mark guiding a function of a display change-over switch for changing information displayed on a display device in a screen of the display device on which at least information of a fuel amount and information of an engine water temperature are displayed when the construction machine is in the operation state.

In the present invention, it is preferable that the display of the guide mark is deleted, an input to the display change-over switch is, not received.

In the present invention, it is preferable that when the construction machine is not in the operation state, the guide mark is displayed on the display device.

In the present invention, it is preferable that when there is an input to an operating lever for operating the construction machine, the display of the guide mark is deleted.

In the present invention, it is preferable that when a state in which the operating lever is at a neutral position is maintained during a predetermined period of time or less, the display of the guide mark is deleted.

According to the present invention, an information display computer program of a construction machine causing a computer to execute the information display method of the construction machine.

According to the present invention, more information necessary when the construction machine is operated can be displayed on the display device while securing visibility of the display device.

DESCRIPTION OF EMBODIMENTS

A form (embodiment) for embodying the present invention will be described in detail with reference to the accompanying drawings. The present invention is not limited by content described in the following embodiment. Further, components which will be described below include ones which can easily be supposed by one skilled in the art, ones which are substantially the same, and ones having an equivalent range. Further, components which will be described below may appropriately be combined. In addition, various omissions, substitutions, or changes of components can be made within a range not departing from the gist of the present invention.

<Example of Construction Machine>

Figure 1:
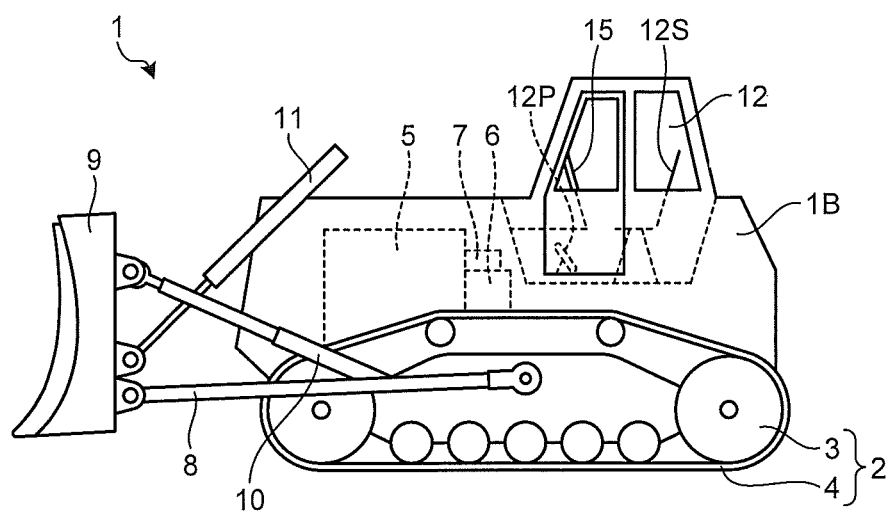
FIG. 1 is a diagram illustrating an example of a construction machine with an information display device according to an embodiment.

FIG. 1 is a diagram illustrating an example of a construction machine with an information display device according to the present embodiment. In the present embodiment, a bulldozer 1 will be described as an example of a construction machine, but an application target of the present embodiment is not limited to the bulldozer 1. The bulldozer 1 includes a vehicle body 1B, a traveling device 2, and a blade 9 serving as a working implement. The vehicle body 1B is equipped with an engine (internal-combustion engine) 5 which is a power generation source, a transmission 6 that transmits power of the engine 5 to the traveling device 2, and a hydraulic pump 7 driven by the engine 5. For example, the engine 5 is a diesel engine, but a kind thereof does not matter. The hydraulic pump 7 pressurizes hydraulic oil by the power of the engine 5.

The traveling device 2 includes a pair of left and right driving wheels 3 and a pair of left and right crawler tracks 4, respectively, driven by the driving wheels 3. The driving wheel 3 is driven by the power of the engine 5 transmitted through the transmission 6, and drives the crawler track 4. Thus, the traveling device 2 causes the bulldozer 1 to travel.

The vehicle body 1B includes a cab 12 which the worker operating the bulldozer 1 gets on. The cab 12 includes a seat 12S in which the worker of the bulldozer 1 sits, a display device 15 that displays a status of the bulldozer 1, an operating lever used for the worker to operate the bulldozer 1, a deceleration pedal for controlling the traveling status of the bulldozer 1 mainly, and an operation pedal 12P other than a brake pedal.

A direction in which the worker of the bulldozer 1 are looking in a state in which the worker sits in the seat 12S of the cab 12 without looking back is referred to as the front of or in front of the bulldozer 1. Alternatively, a direction from the seat 12S of the cab 12 to the display device 15 or the operation pedal 12P is referred to as the front of or in front of the bulldozer 1. The front thereof or in front there is opposite to the back thereof or behind. The back thereof or behind is a direction from the display device 15 or the operation pedal 12P of the cab 12 to the seat 12S.

The blade 9 is arranged in front of the vehicle body 1B. The blade 9 is supported by the vehicle body 1B through a frame 8. One end portion of the frame 8 is attached to swing relative to the blade 9, and the other end portion thereof is attached to swing relative the vehicle body 1B. Through this structure, the blade 9 can swing centering on the other end portion of the frame 8.

A tilt adjusting hydraulic cylinder 10 and a lifting/lowering hydraulic cylinder 11 are attached between the vehicle body 1B and the blade 9. The tilt adjusting hydraulic cylinder 10 adjusts a tilt of the blade 9 relative to the ground surface. The lifting/lowering hydraulic cylinder 11 lifts or lowers the blade 9. The tilt adjusting hydraulic cylinder 10 and the lifting/lowering hydraulic cylinder 11 are expanded and contracted by hydraulic oil transferred from the hydraulic pump 7, and change a posture of the blade 9. For example, the bulldozer 1 may have a hybrid system in which the blade 9 is operated by driving an electric motor by electric power generated from a generator driven by the engine 5.

Figure 2:
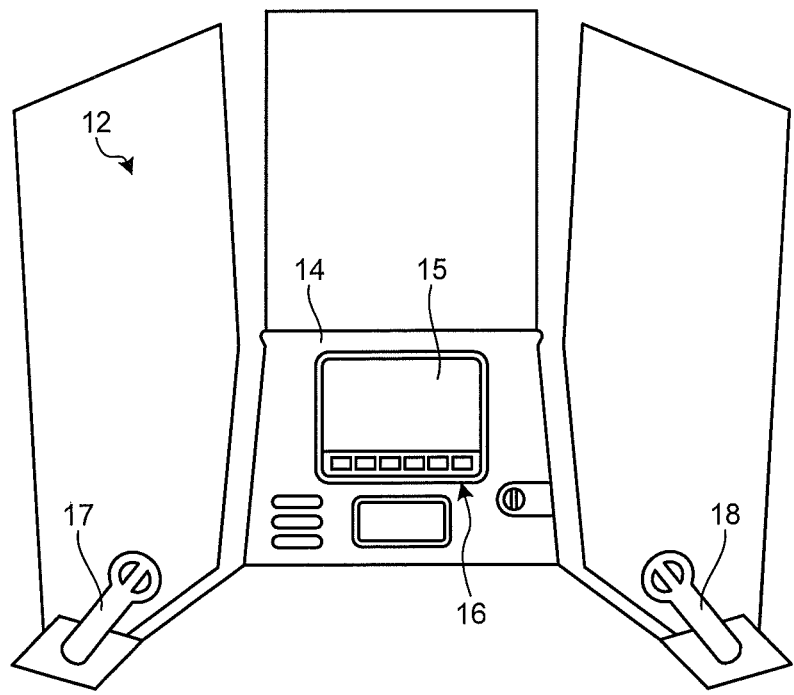
FIG. 2 is a diagram illustrating a dashboard of a bulldozer viewed from the seat side.

FIG. 2 is a diagram illustrating a dashboard of the bulldozer viewed from the seat side. A dashboard 14 is arranged in the front of the bulldozer 1 in the cab 12. When the dashboard 14 is viewed from the seat 12S side illustrated in FIG. 1, the display device 15 is arranged in the front. A traveling operating lever 17 serving as an operating lever for operating the bulldozer 1 is arranged on the left side in the front, and a working implement operating lever 18 serving as an operating lever is arranged on the right side. The traveling operating lever 17 controls an operation related to traveling of the bulldozer 1, for example, forward and backward traveling, transmission, and left and right swing. The working implement operating lever 18 controls an operation of the blade 9.

For example, the display device 15 is implemented by, but not limited to, an LCD. The display device 15 is mounted in a construction machine (the bulldozer 1 in the present embodiment), and displays various types of information (construction machine information) of the construction machine. Examples of the construction machine information include a coolant temperature of the engine 5 illustrated in FIG. 1, the pressure of hydraulic oil ejected from the hydraulic pump 7, fuel consumption of the engine 5, and the temperature of lubrication oil of the engine 5.

A display change-over switch (hereinafter, referred to as a "function switch") 16 for changing information to be displayed on the display device 15 is arranged below the display device 15, that is, the floor side of the cab 12. In the present embodiment, the function switch 16 is configured to be integrated with the display device 15. However, the function switch 16 is not limited to one which is integrated with the display device 15. For example, the function switch 16 may be disposed in a console beside the seat 12S. The worker of the bulldozer 1 can operate the function switch 16 to change the construction machine information to be displayed on the display device 15. The number of the function switches 16 is not limited. Next, an information display device according to the present embodiment will be described.

<Information Display Device>

Figure 3:
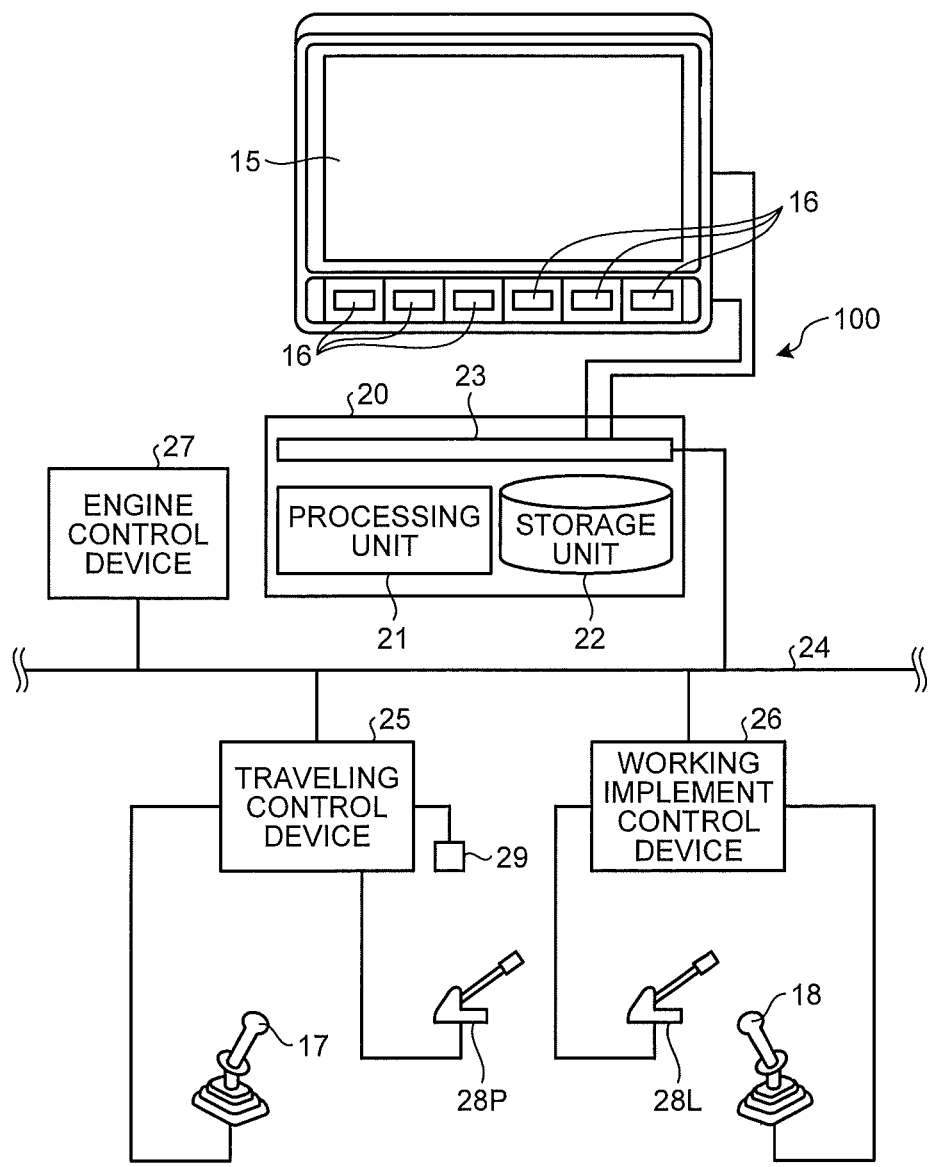
FIG. 3 is a diagram illustrating an information display device according to the embodiment.

FIG. 3 is a diagram illustrating the information display device according to the present embodiment. An information display device 100 includes the display device 15 and a control device 20. The control device 20 changes the construction machine information to be displayed on the display device 15, executes an information display method according to the present embodiment, and executes control related to reception of an operation of the function switch 16. For example, the control device 20 includes a microcomputer. The control device 20 includes a processing unit 21, a storage unit 22, and an I/O unit 23. For example, the processing unit 21 is a central processing unit (CPU), and the storage unit 22 is implemented by a random access memory (RAM), a read only memory (ROM), an external storage device, or a combination thereof.

The control device 20 is connected to the display device 15 and the function switch 16 via the I/O unit 23. The processing unit 21 transfers a control signal to the display device 15 or the function switch 16 via the I/O unit 23, and acquires a signal from the display device 15 or the function switch 16 via the I/O unit 23. The storage unit 22 stores a computer program for controlling the display device 15 and the function switch 16, a computer program (hereinafter, referred to as an "information display program" as necessary) for executing the information display method according to the present embodiment, and data necessary for control.

The information display method according to the present embodiment can be implemented by the information display program described above. Thus, when the information display program is installed in the storage unit 22 of the existing bulldozer 1, the existing bulldozer 1 can perform a display through the display device 15 by the information display method according to the present embodiment. As described above, there is an advantage by which the existing construction machine can easily be updated by the information display program. The information display program is an installable file or an executable file, and may be configured to be recorded in and provided as a computer readable recording medium such as a CD-ROM, a flexible disk (FD), a CD-R, or a DVD. In addition, the information display program may be provided such that the information display program is stored in a computer connected to a network such as the Internet and downloaded via the network. Further, the information display program may be configured to be provided or distributed via a network such as the Internet.

The control device 20 is electrically connected with a communication line 24 mounted in the bulldozer 1. For example, the communication line 24 is electrically connected to other control devices mounted in the bulldozer 1 such as a traveling control device 25, a working implement control device 26, and an engine control device 27. As described above, the control device 20 performs mutual communication with the traveling control device 25 and the working implement control device 26 via the communication line 24 to acquire or transmit the construction machine information.

Each of the traveling control device 25, the working implement control device 26, and the engine control device 27 includes a microcomputer. The traveling control device 25 is connected with the traveling operating lever 17, a parking brake 28P, and a vehicle speed sensor 29. The traveling control device 25 controls traveling of the bulldozer 1 based on the construction machine information acquired therefrom. The working implement control device 26 is connected with the working implement operating lever 18 and a working implement locking lever 28L. The working implement control device 26 controls an operation of the blade 9 based on the construction machine information acquired therefrom. The engine control device 27 controls an operation of the engine 5 illustrated in FIG. 1 based on deceleration pedal operation information acquired from the deceleration pedal, a throttle signal acquired from a fuel adjustment dial, and the like.

In the present embodiment, operation amounts of the traveling operating lever 17 and the working implement operating lever 18 are converted into electric signals and then output as the electric signals. The traveling control device 25 and the working implement control device 26 control traveling of the bulldozer 1 and an operation of the blade 9 based on the electric signals output from the traveling operating lever 17 and the working implement operating lever 18, that is, the operation amounts thereof. As described above, in the present embodiment, the traveling operating lever 17 and the working implement operating lever 18 employ an electrical command scheme, but are not limited to this example. For example, the traveling operating lever 17 and the working implement operating lever 18 may employ a mechanical scheme in which traveling of the bulldozer 1 and the operation of the blade 9 are controlled by operating hydraulic pressure. In this case, for example, the control device 20 acquires positions of the traveling operating lever 17 and the working implement operating lever 18 from the position sensors installed therein, and implements the information display method according to the present embodiment. Next, an example of the construction machine information displayed on the display device 15 will be described.

<Display Example of Display Device>

Figure 4:
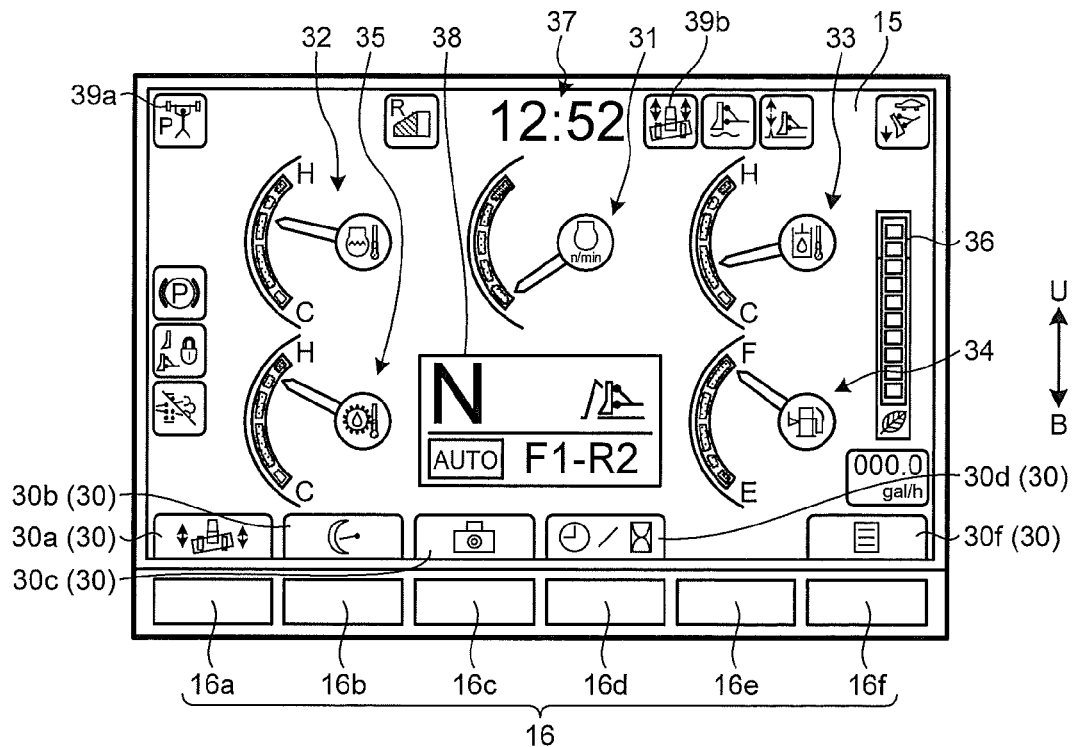
FIG. 4 is a diagram illustrating an example of a state in which construction machine information is displayed on a display device of an information display device according to the embodiment.
Figure 5:
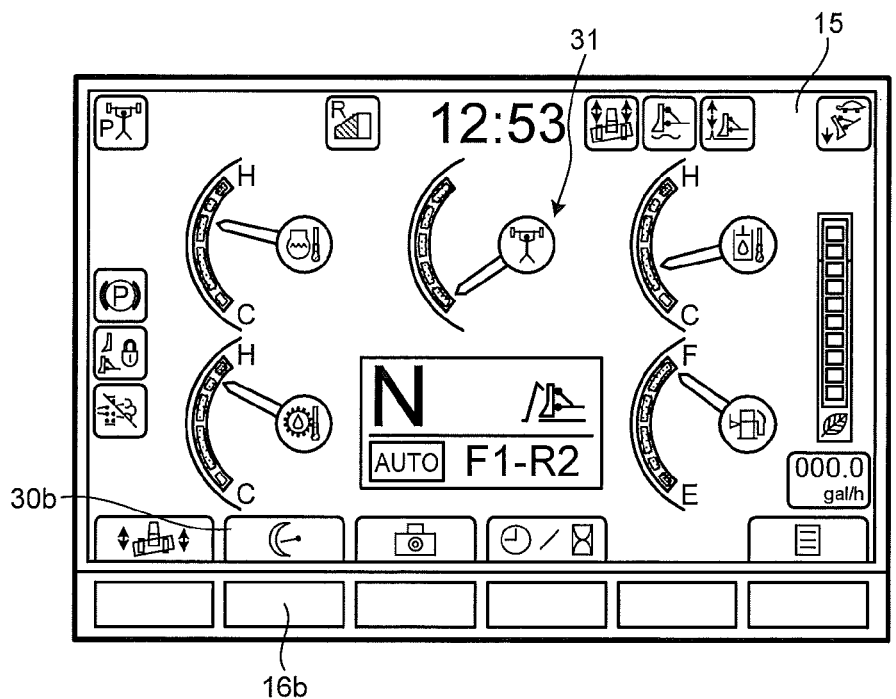
FIG. 5 is a diagram illustrating an example of a state in which construction machine information is displayed on a display device of an information display device according to the embodiment.

FIGS. 4 and 5 are diagrams illustrating examples of states in which the construction machine information is displayed on the display device of the information display device according to the present embodiment. There are many cases in which the construction machine information is displayed on the display device 15 in the form of an icon so that the worker easily views the construction machine information while operating the bulldozer 1. The icon is one in which an object is symbolized by a simple design and displayed. In the example illustrated in FIG. 4, a plurality of icons and the construction machine information expressed by a numerical value are displayed on the display device 15.

In FIG. 4, the upper side of the display device 15 is a ceiling side of the cab 12 which is represented by an arrow U, and the lower side thereof is a floor side of the cab 12 which is represented by an arrow B. A plurality of (6 in this example) function switches 16a, 16b, 16c, 16d, 16e, and 16f are arranged on the lower side of the display device 15. A reference numeral 16 is used when the function switches are not particularly distinguished from one another, where reference numerals 16*a*, 16*b*, and the like are used when distinguished from one another. Function guides 30*a*, 30*b*, 30*c*, 30*d*, and 30*f* serving as guide marks are displayed at the position corresponding to function switches 16*a*, 16*b*, 16*c*, 16*d*, 16*e*, and 16*f* in the lower end portion of the screen of the display device 15. A reference numeral 30 is used when the function guides are not particularly distinguished from one another, where reference numerals 30*a*, 30*b*, and the like are used when distinguished from one another.

In the present embodiment, the plurality of function switches 16 are arranged in the lower side of the display device 15, but the plurality of function switches 16 may be arranged at any other position. For example, the plurality of function switches 16 may be arranged at the side or the upper side of the display device 15. In this case, the plurality of function guides 30 are displayed on the screen of the display device 15 at the positions corresponding to the function switches 16, respectively. For example, when the plurality of function switches 16 are arranged on the side of the display device 15, the plurality of function guides 30 respectively corresponding to the function switches 16 are displayed on the side end portion of the screen of the display device 15.

Each of the function guides 30 is a mark for guiding a function of the function switch 16, and displayed on the display device 15 in the form of an icon in the present embodiment. In other words, each of the function guide 30 displays a function of the corresponding function switch 16 in the form of an icon. A function of each of the function guides 30 is allocated with respect to a screen on which the function guides 30 are displayed. The worker can intuitively understand the function of the function switch 16 through the function guide 30 and select a desired function switch 16. Further, since the function guide 30 displays the function of the function switch 16, the worker's visibility is improved.

In the example illustrated in FIG. 4, the display device 15 displays five meter-type gauge icons. That is, a multi gauge 31, an engine water temperature gauge 32, a hydraulic oil temperature gauge 33, a fuel gauge 34, and a mission oil temperature gauge 35 are displayed. The icon includes an indicator and a circular memory, and levels of various kinds of construction machine information are displayed as the indicator rotates. In addition, the display device 15 displays a power save gauge 36 representing a mark of energy saving driving based on the fuel consumption, a clock 37 displaying a time, a status indicator 38 representing a current traveling status of the bulldozer 1 and the like, and function display icons 39*a* and 39*b* displaying functions of the bulldozer 1.

The multi gauge 31 is a mark by which a plurality of types of construction machine information are switched by the function switch 16 and displayed. In the present embodiment, the multi gauge 31 can operate the function switch 16*b* to change the type of the construction machine information to be displayed. For example, in the example illustrated in FIG. 4, the rotational speed (the engine speed per unit time) of the engine 5 mounted in the bulldozer 1 illustrated in FIG. 1 is displayed. When the function switch 16*b* corresponding to the function guide 30*b* is operated, a display of the multi gauge 31 is changed to display pulling power as illustrated in FIG. 5. Examples of the construction machine information displayed by the multi gauge 31 include hydraulic oil pressure, engine hydraulic pressure, a battery voltage, pulling power, a vehicle speed, a clock, and an engine rotational speed. In the present embodiment, a single piece of construction machine information displayed by the multi gauge 31 is changed each time the function switch 16*b* is operated once.

In recent years, the construction machine, particularly, the bulldozer 1 tends to increase the amount of the construction machine information displayed on the display device 15. Among pieces of construction machine information displayed by the multi gauge 31, included is information which is preferable to be displayed on the screen of the display device 15 when the bulldozer 1 is operated (when an operation of causing the bulldozer 1 to travel is performed, when the blade 9 is operated, or the like) such as pulling power or vehicle speed. However, due to a restriction in the screen size of the display device 15, only one construction machine information is displayed on the multi gauge 31.

A design of a gauge icon to be displayed on the display device 15 may be changed such that a use area per gauge icon is reduced while maintaining visibility of the worker, and in this case, the number of gauge icons which can be displayed on the display device 15 can be increased. However, when the screen design of the display device 15 is changed from the current model, the existing user may feel uncomfortable. Further, since there are many cases in which the construction machine matches other models in the screen design of the display device 15, it is difficult to change the screen design of one model (for example, an excavator). For this reason, it is difficult to change the screen design of the display device 15.

For example, the pulling power and the vehicle speed are the construction machine information which is not necessary when the bulldozer 1 is stopped or is not operated. The construction machine information is required for the first time when the bulldozer 1 is operated. Further, the construction machine information representing the status of the blade 9 which is the working implement is not necessary when the bulldozer 1 is stopped or is not operated, and required for the first time when the bulldozer 1 is operated. As described above, the construction machine information displayed on the screen of the display device 15 is required for the first time when the bulldozer 1 is operated. Meanwhile, the function switch 16 is not operated unless a special event such as an error occurs when the bulldozer 1 is operated, and the function switch 16 is operated when the bulldozer 1 is not operated. For this reason, there is no problem even though the function guide 30 is deleted and not displayed on the screen of the display device 15 when the bulldozer 1 is operated.

In this regard, in the information display device 100 and the information display method according to the present embodiment, when the bulldozer 1 is operated, the function guide 30 is deleted from the screen of the display device 15, and the construction machine information necessary when the bulldozer 1 is operated is displayed instead. In this case, the construction machine information necessary when the bulldozer 1 is operated is displayed at the position of the function guide 30. As a result, more pieces of construction machine information can be displayed while the bulldozer 1 is being operated. Next, a process of the information display device 100, that is, a process of the information display method according to the present embodiment will be described.

<Process Example of Information Display Method>

Figure 6:
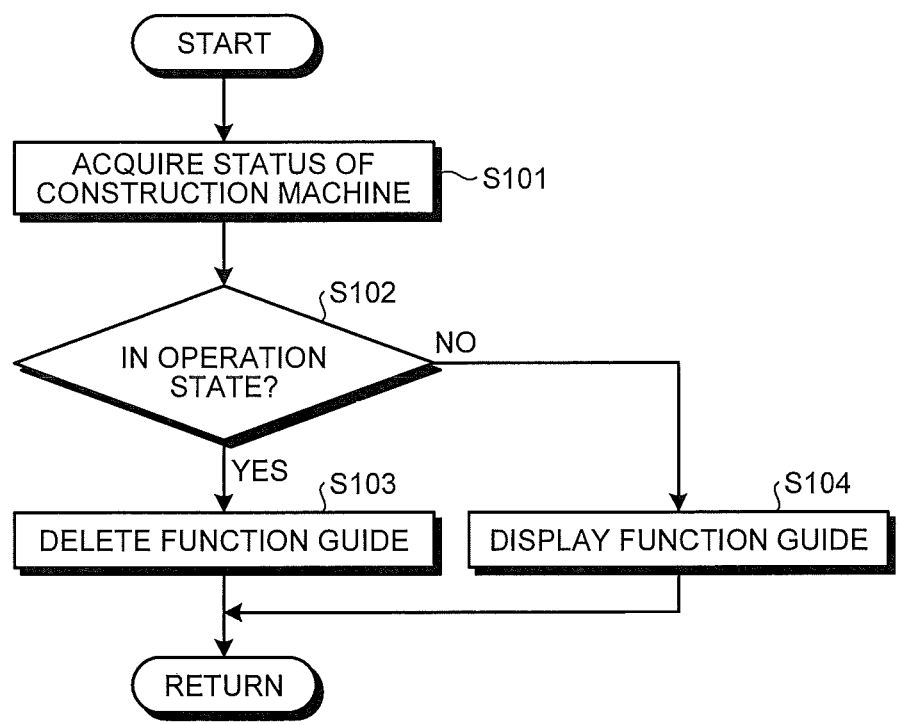
FIG. 6 is a flowchart illustrating a process of an information display method according to the embodiment.
Figure 7:
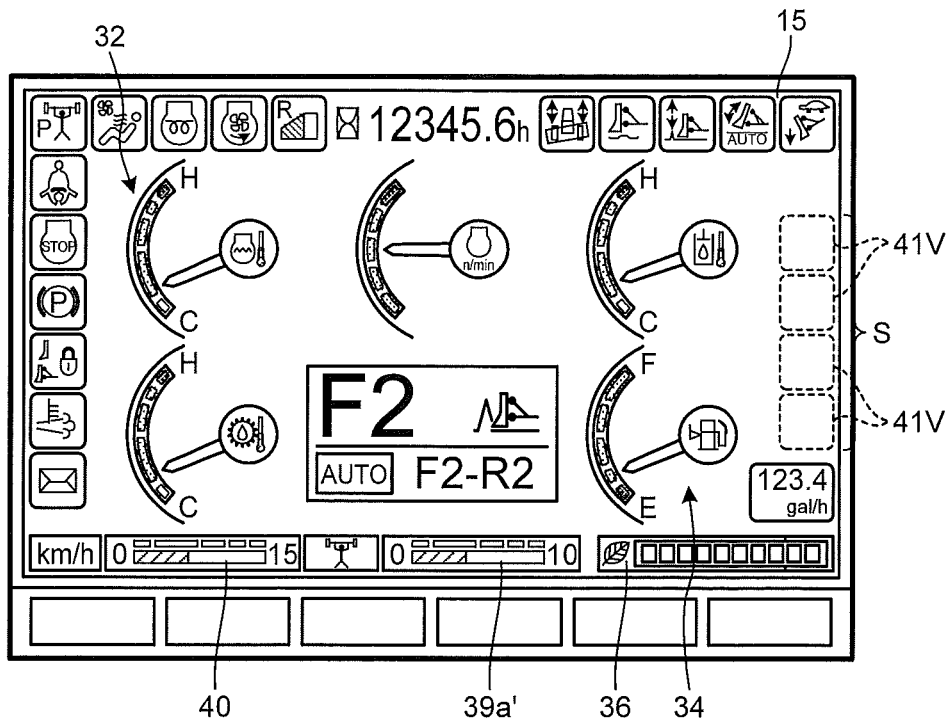
FIG. 7 is a diagram illustrating an example of a screen displayed on a display device.
Figure 8:
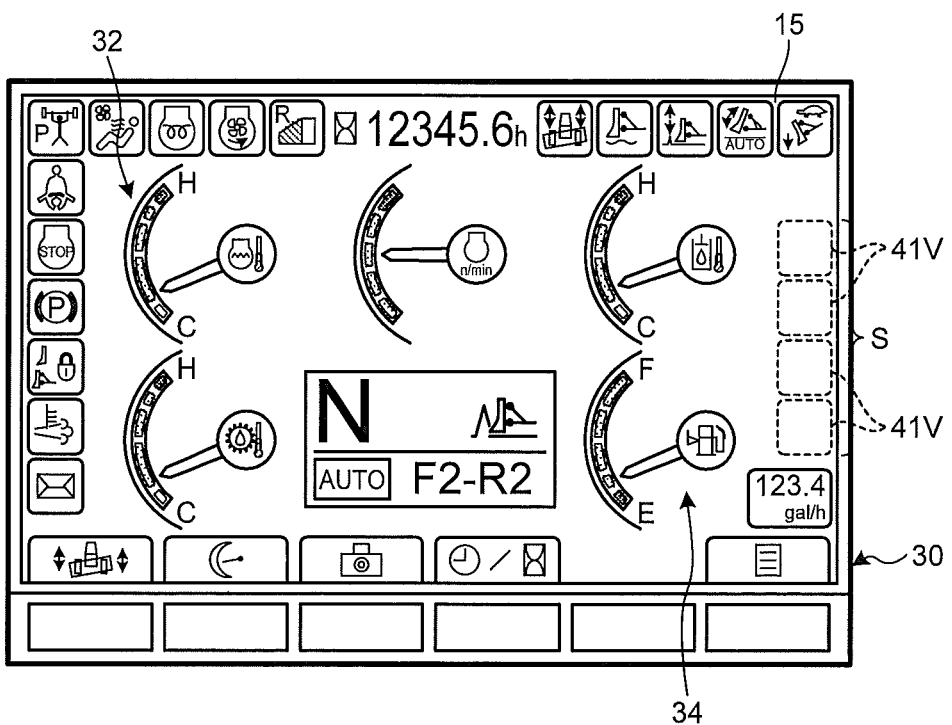
FIG. 8 is a diagram illustrating an example of a screen displayed on a display device.
Figure 9:
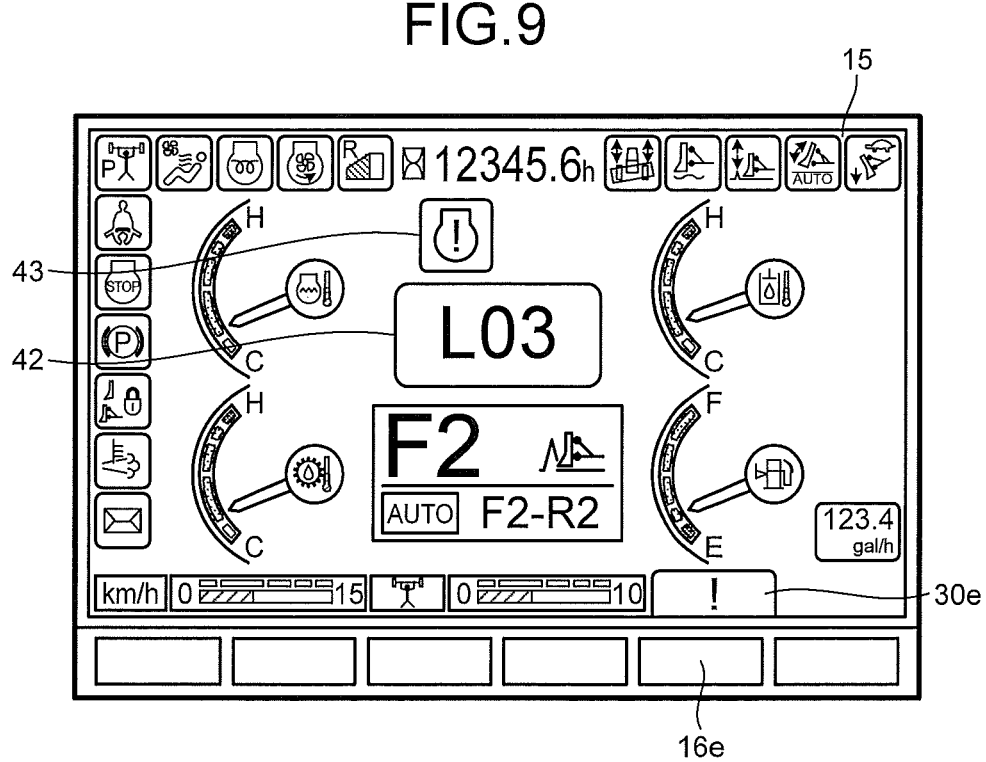
FIG. 9 is a diagram illustrating an example of a screen displayed on a display device.

FIG. 6 is a flowchart illustrating a process of the information display method according to the present embodiment. FIGS. 7 to 9 are diagrams illustrating examples of the screen displayed on the display device. The information display method according to the present embodiment is implemented by the information display device 100. More specifically, the information display method according to the present embodiment is implemented such that the processing unit 21 of the control device 20 reads an information display program from the storage unit 22, and executes a command described in the information display program. The display device 15 illustrated in FIGS. 4 and 5 displays a time, but the display device 15 illustrated in FIGS. 7 to 9 displays an operating time representing an accumulative operating time of the bulldozer 1.

In step S101, the control device 20 (more specifically, the processing unit 21) of the information display device 100 acquires a status of the construction machine (the bulldozer 1 in the present embodiment). In the present embodiment, the control device 20 acquires statuses of the traveling operating lever 17 and the working implement operating lever 18 via the communication line 24 illustrated in FIG. 3. In this state, it is possible to determine whether or not the bulldozer 1 is in the operation state, that is, whether or not the worker is operating the bulldozer 1.

Next, when it is determined in step S102 that the bulldozer 1 is in the operation state (Yes in step S102), the control device 20 causes the process to proceed to step S103, but when it is determined that the bulldozer 1 is not in the operation state (No in step S102), the process proceeds to step S104. When at least one of the traveling operating lever 17 and the working implement operating lever 18 receives an input, that is, is not at the neutral position, the bulldozer 1 is in a traveling state or the blade 9 is in an operating state. In other words, the bulldozer 1 is in the operation state, that is, the worker is operating the bulldozer 1. Thus, when at least one of the traveling operating lever 17 and the working implement operating lever 18 receives an input (is not at the neutral position), the control device 20 obtains a positive result (Yes) in step S102, and causes the process to proceed to step S103. Further, when none of the traveling operating lever 17 and the working implement operating lever 18 receives an input (are at the neutral position), the control device 20 obtains a negative result (No) in step S102, and causes the process to proceed to step S104. As described above, it is possible to easily and reliably determine whether or not the bulldozer 1 is in the operation state using the statuses of the traveling operating lever 17 and the working implement operating lever 18. Particularly, the bulldozer 1 has a unique use method in which the blade 9 is operated even when the bulldozer 1 does not travel. It is possible to easily and reliably determine whether or not the bulldozer 1 is in the operation state even in the unique use method using the statuses of the traveling operating lever 17 and the working implement operating lever 18. When step S103 or step S104 ends, the process returns to the start, and then the information display method according to the present embodiment is repeated.

The status of the bulldozer 1 may be determined using information of the vehicle speed sensor 29 illustrated in FIG. 3. In this case, for example, even when an error occurs in a sensor of detecting the status of the traveling operating lever 17 and so it is difficult for the control device 20 to acquire the status of the traveling operating lever 17, the status of the bulldozer 1 can be determined based on the information of the vehicle speed sensor 29. In addition, the status of the bulldozer 1 may be determined using the information of the parking brake 28P and the working implement locking lever 28L illustrated in FIG. 3. For example, when the parking brake 28P and the working implement locking lever 28L are enabled, the bulldozer 1 may not be in the operation state.

When the bulldozer 1 is in the operation state (Yes in step S102), in step S103, the control device 20 deletes a display the function guide 30 from the display device 15 as illustrated in FIG. 7. In other words, the control device 20 causes the display device 15 not to display the function guide 30. At this time, the control device 20 may display the construction machine information necessary when the bulldozer 1 is in the operation state at the position at which the function guide 30 has been displayed so far. In the example illustrated in FIG. 7, a vehicle speed gauge 40 representing information of the vehicle speed, a pull gauge 39a', and the power save gauge 36 are displayed.

Since the construction machine information necessary when the bulldozer 1 is in the operation state is displayed using the position at which the function guide 30 has been displayed as described above, it is unnecessary to reduce the size of an icon representing the construction machine information or the like. As a result, visibility of the display device 15 can be secured, and more pieces of construction machine information necessary when the bulldozer 1 is operated can be displayed on the display device 15 when the bulldozer 1 is in the actual operation state. Further, the worker can understand the construction machine information necessary when the bulldozer 1 is operated without taking his/her hands from the traveling operating lever 17 and the working implement operating lever 18. In addition, in the present embodiment, since the power save gauge 36 is displayed at the position of the function guide 30, a space S in which the power save gauge 36 has been displayed becomes empty. Thus, even when the amount of construction machine information displayed on the display device 15 increases, an icon 41V corresponding to an increased amount or the like can be displayed in the space S, and thus it is possible to cope with an increase in the construction machine information to be displayed.

The construction machine information to be displayed at the position the function guide 30 deleted by the control device 20 may be a mark displayed such that a plurality of pieces of construction machine information are changed by the function switch 16, that is, construction machine information allocated to the multi gauge 31. Examples of the construction machine information displayed by the multi gauge 31 include the hydraulic oil pressure, the engine hydraulic pressure, the battery voltage, the pulling power, the vehicle speed, the clock, and the engine rotational speed, and the control device 20 may display at least one of the above-mentioned information at the position of the function guide 30. Since a single piece of construction machine information displayed by the multi gauge 31 is changed each time the function switch 16b is operated once, it may take a great deal of time until necessary construction machine information is selected. Through the above-described technique, when the number of pieces of construction machine information displayed by the multi gauge 31 is reduced, a time to select the construction machine information to be displayed on the multi gauge 31 can be reduced, and thus a convenience is improved. Further, through the above-described technique, new construction machine information which corresponds to the reduced number of pieces of construction machine information displayed by the multi gauge 31 may be added as an option of the construction machine information displayed by the multi gauge 31.

When the bulldozer 1 is in the operation, the display device 15 displays the screen on which at least information of a fuel amount and information of the engine water temperature are displayed. This screen is referred to as a standard screen. The standard screen is displayed unless a menu screen which will be described later is selected after the bulldozer 1 starts up, and displayed even when the bulldozer 1 is in the stop state or the non-operation state as well as when the bulldozer 1 is in the operation state. In the example illustrated in FIG. 7, the engine water temperature gauge 32 and the fuel gauge 34 are displayed. The control device 20 deletes a display of the function guide 30 when the display device 15 displays the screen. In this case, the control device 20 may delete a display of all of the function guides 30 or may delete a display of some of the plurality of function guides 30 and display the remaining function guides 30.

When the display of the function guide 30 is deleted, it is preferable that the function switch 16 be caused not to receive an input. In the present embodiment, when the control device 20 deletes the display of the function guide 30, the function switch 16 is caused not to receive an input. As a result, even when the function switch 16 is erroneously operated, the screen displayed on the display device 15 does not change, and thus the worker can reliably acquire the construction machine information necessary when the bulldozer 1 is operated.

When it is determined that the bulldozer 1 is not in the operation state (No in step S102), in step S104, the control device 20 causes the function guide 30 to be displayed on the display device 15 as illustrated in FIG. 8. At this time, when the function guide 30 is displayed, the control device 20 causes the construction machine information, which is meaningfully displayed when the bulldozer 1 is operated compared to when the bulldozer 1 is not in the operation state, not to be displayed on the display device 15. As this sort of construction machine information, for example, there is a vehicle speed of the bulldozer 1. The vehicle speed of the bulldozer 1 is zero (0) when the bulldozer 1 is in the stop state, but even when the fact that the vehicle speed is zero (0) is displayed on the display device 15 when the bulldozer 1 in the stop state, this information is not meaningful to the worker compared to the vehicle speed displayed in the operation state.

The construction machine information which is meaningfully displayed in the operation state compared to when the bulldozer 1 is not in the operation state is caused not to be displayed when the function guide 30 is displayed on the display device 15. Thus, an icon representing the construction machine information which is meaningfully displayed in the operation state compared to when the bulldozer 1 is not in the operation state, for example, the space S in which the power save gauge 36 has been displayed becomes empty. As a result, even when the amount of construction machine information displayed on the display device 15 increases, the icon 41V corresponding to the increased amount or the like can be displayed on the space S, and thus it is possible to cope with an increase in the construction machine information to be displayed.

In the above example, when the bulldozer 1 in the traveling state, a display of the display device 15 is the same as when the blade 9 is being operated. However, when the bulldozer 1 in the traveling state, the control device 20 causes a display of the display device 15 to be different from when the blade 9 is being operated. For example, when the bulldozer 1 is in the traveling state, the control device 20 may cause the construction machine information necessary for traveling such as the vehicle speed, and a fuel consumption rate to be displayed at the position of the function guide 30. Further, when the blade 9 is operated in the stop state of the bulldozer 1, the construction machine information necessary for an operation of the blade 9 such as a tilt angle and a lifting/lowering amount may be displayed at the position of the function guide 30. As a result, when the bulldozer 1 is in the traveling state and the blade 9 is in the operation state, more appropriate construction machine information can be displayed on the display device 15, and thus the worker can more effectively use the construction machine information displayed on the display device 15.

In step S102, a determination on whether or not the bulldozer 1 is in the operation state is made based on a determination on whether or not the operating lever, specifically, at least one of the traveling operating lever 17 and the working implement operating lever 18 is at the neutral position. The control device 20 determines that the operating lever is in the neutral position when the state in which the operating lever is at the neutral position is continuously maintained during a predetermined period of time or more, and determines that the operating lever is not in the neutral position when the state in which the operating lever is at the neutral position is continuously maintained during less than the predetermined period of time, that is, determines that the operating lever has been operated.

For example, the control device 20 determines that the traveling operating lever 17 is not at the neutral position in the process of changing the traveling operating lever 17 from the forward movement position to the backward movement position or from the backward movement position to the forward movement position. Similarly, when the traveling operating lever 17 is operated to the forward movement position or the backward movement position, the control device 20 determines that the traveling operating lever 17 is not at the neutral position. When a state in which the traveling operating lever 17 is between the forward movement position and the backward movement position, that is, a state in which the traveling operating lever 17 is at the neutral position is continuously maintained during more than a predetermined period of time, the control device 20 determines that the traveling operating lever 17 is at the neutral position.

When the operating lever is not at the neutral position, that is, when the state in which the operating lever is at the neutral position is maintained during a predetermined period of time or less, the control device 20 determines that the bulldozer 1 is in the operation state (Yes in step S102), and causes the process to proceed step S103. Further, when the operating lever is at the neutral position, that is, when the state in which the operating lever is at the neutral position is maintained during more than a predetermined period of time, it is determined that the bulldozer 1 is not in the operation state (No in step S102), and the process proceeds to step S104.

When the operating lever instantaneously transitions to the neutral position, for example, an operation of the bulldozer 1 is continued in the process of changing the traveling operating lever 17 from the forward movement position to the backward movement position, but when the operating lever instantaneously transitions to the neutral position by the above-described operation, the screen when the bulldozer 1 is operated is continuously displayed. In this case, the function guide 30 is not displayed on the display device 15. Thus, cumbersome switching of the screen of the display device 15 can be avoided, and the worker can acquire the construction machine information necessary when the bulldozer 1 is operated from the display device 15.

A certain error may occur when the bulldozer 1 is in the operation state. In this case, an error code 42 and an error notice icon 43 representing the occurrence of a failure are displayed on the display device 15 as illustrated in FIG. 9. When an error occurs while the bulldozer 1 is being operated, the control device 20 causes the function guide 30e representing the function switch 16e for switching to the screen displaying information of an error occurred in the bulldozer 1 to be displayed on the display device 15 as illustrated in FIG. 9. As a result, the worker operates the function switch 16e to read the screen describing the details of an error and output the screen to the display device 15, and thus the error can be rapidly resolved. In the present embodiment, the power save gauge 36 illustrated in FIG. 7 is displayed at the position at which the function guide 30*e* is displayed. Thus, the control device 20 deletes the power save gauge 36, and then causes the function guide 30*e* to be displayed on the display device 15.

<Example of Menu Screen>

Figure 10:
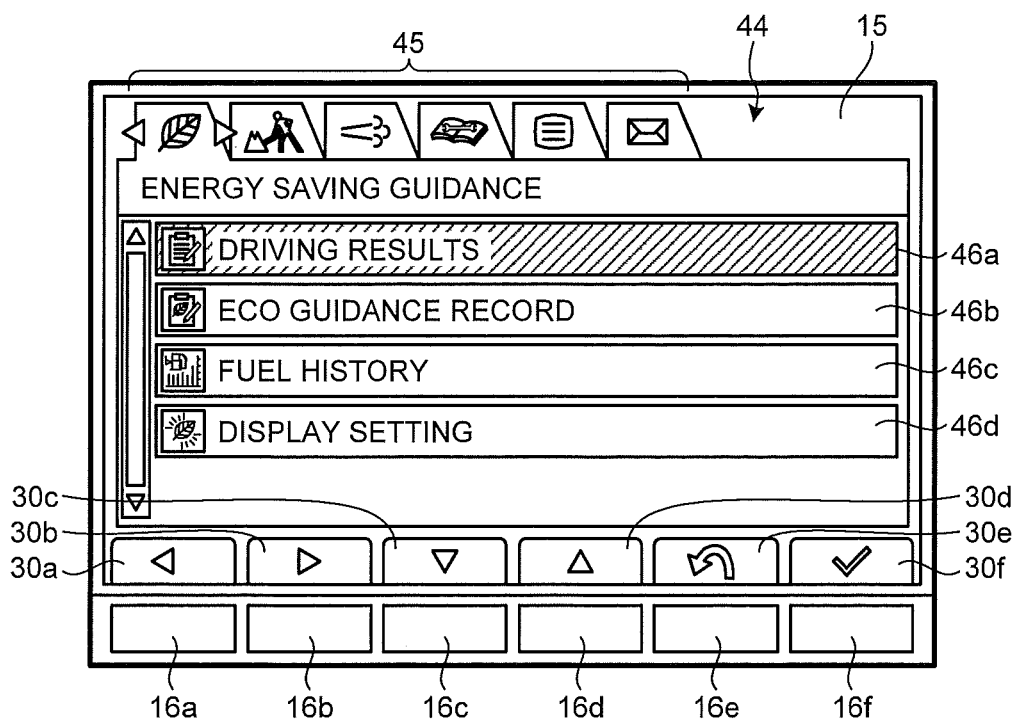
FIG. 10 is a diagram illustrating an example of a menu screen.

FIG. 10 is a diagram illustrating an example of a menu screen. A menu screen 44 is displayed on the display device 15 illustrated in FIG. 10. The menu screen 44 is a screen customized for the worker to easily use the information display device 100. When the menu screen 44 is displayed, the function switches 16*a*, 16*b*, 16*c*, 16*d*, 16*e*, and 16*f* are allocated a cursor moving function and a confirmation function by the corresponding function guides 30*a*, 30*b*, 30*c*, 30*d*, 30*e*, and 30*f*, respectively.

As illustrated in FIG. 10, the menu screen 44 has a function display tab 45 used to select a plurality of functions. In FIG. 10, an energy saving guidance is displayed as a function displayed on the menu screen 44. Further, a plurality of setting items 46*a*, 46*b*, 46*c*, and 46*d* included in the energy saving guidance are displayed on the menu screen 44. The worker selects a function using the function switches 16*a*, 16*b*, 16*c*, 16*d*, 16*e*, and 16*f* and set a setting item of the selected function.

After a display of the display device 15 is switched to the menu screen 44, when nothing is input during a predetermined period of time, the control device 20 switches a display of the display device 15 to the standard screen, that is, to the screen on which information of a fuel amount and information of the engine water temperature are displayed. As described above, the function guides 30*a*, 30*b*, 30*c*, 30*d*, 30*e*, and 30*f* for setting are displayed on the menu screen 44. When at least one of the traveling operating lever 17 and the working implement operating lever 18 receives an input in the state in which the menu screen 44 is displayed on the display device 15, the control device 20 maintains the state in which the menu screen 44 is displayed on the display device 15. In other words, the function guides 30*a*, 30*b*, 30*c*, 30*d*, 30*e*, and 30*f* are displayed, and the control device 20 receives an input of the function switch 16*a*, 16*b*, 16*c*, 16*d*, 16*e*, or 16*f*. When the worker causes the menu screen 44 to be displayed, the worker's display intention can be expected, and thus it is to give priority to the worker's intention.

After a display of the display device 15 is switched to the menu screen 44, the control device 20 maintains the state in which the menu screen 44 is displayed on the display device 15. In other words, the function guides 30*a*, 30*b*, 30*c*, 30*d*, 30*e*, and 30*f* are displayed on the display device 15, and the control device 20 receives an input of the function switch 16*a*, 16*b*, 16*c*, 16*d*, 16*e*, or 16*f*. When there is no input to the function switch 16*a*, 16*b*, 16*c*, 16*d*, 16*e*, or 16*f* during a predetermined period of time, the control device 20 switches the display of the display device 15 to the standard screen, that is, the screen on which at least information of a fuel amount and information of the engine water temperature are displayed.

Modified Example

Figure 11:
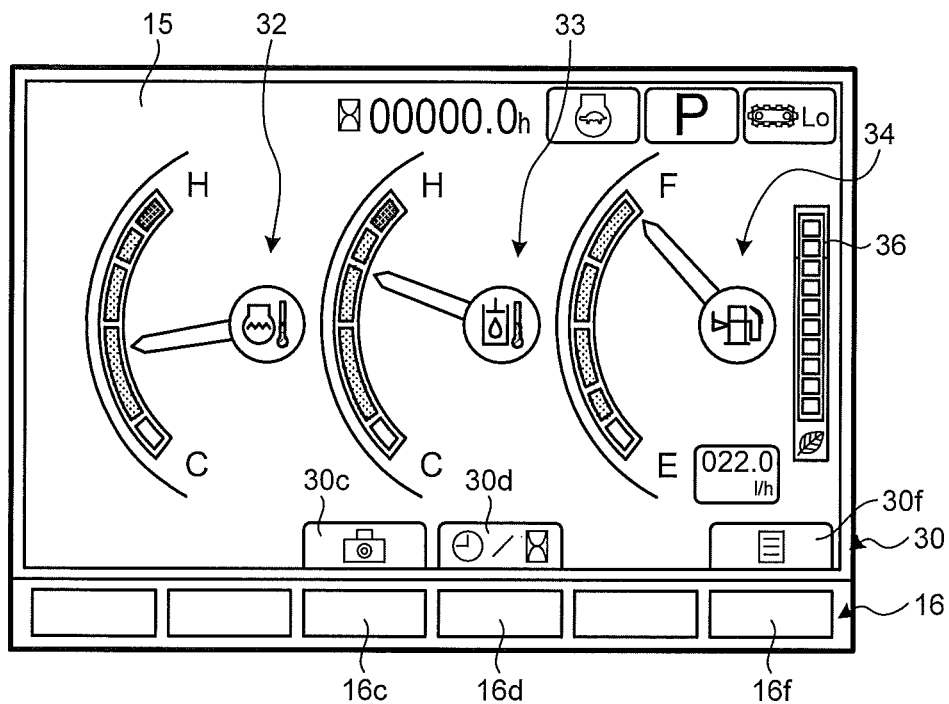
FIG. 11 is a diagram illustrating an example in which an information display method according to the embodiment is applied to a construction machine other than a bulldozer.
Figure 12:
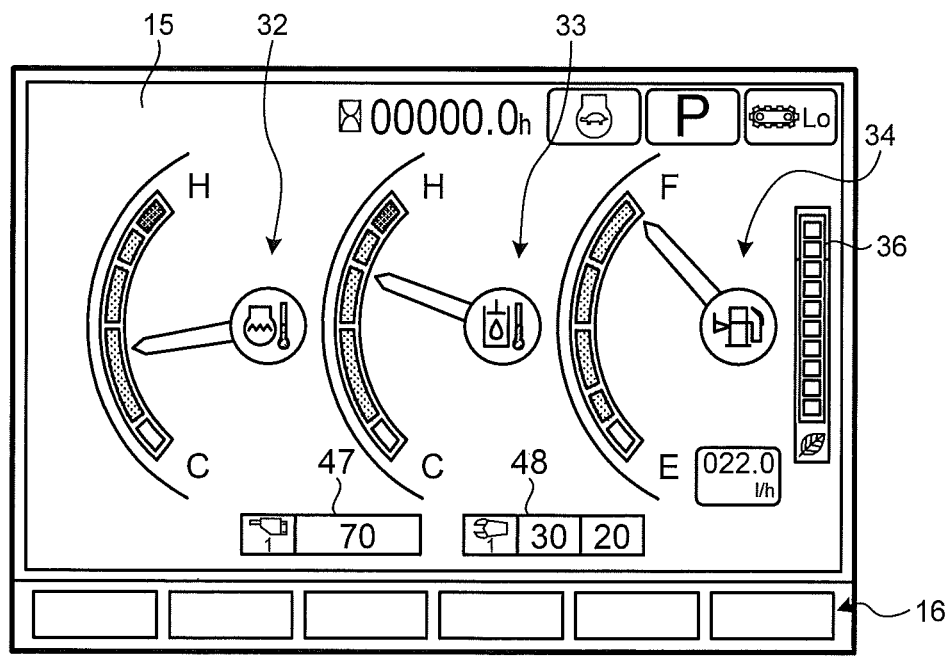
FIG. 12 is a diagram illustrating an example in which an information display method according to the embodiment is applied to a construction machine other than a bulldozer.

FIGS. 11 and 12 are examples illustrating an example in which the information display method according to the present embodiment is applied to a construction machine other than a bulldozer. In this modified example, an excavator is used as construction machine other than the bulldozer 1. FIG. 11 is a display example of the display device 15 when the hydraulic shovel is not in the operation, and FIG. 12 is a display example of the display device 15 when the excavator is in the operation. In this modified example, the information display device 100 (see FIG. 3) is applied to the excavator as is.

The display device 15 displays the engine water temperature gauge 32, the hydraulic oil temperature gauge 33, the fuel gauge 34, the power save gauge 36, and the function guides 30*c*, 30*d*, and 30*f*. Each of the function switches 16*c*, 16*d*, and 16*f* respectively corresponding to the function guides 30*c*, 30*d*, and 30*f* is allocated a predetermined function. At least information of a fuel amount and information of the engine water temperature are displayed on the screen displayed on the display device 15 through the fuel gauge 34 and the engine water temperature gauge 32. Thus, the screen displayed on the display device 15 is the standard screen.

When the excavator is in the operation state, the control device 20 illustrated in FIG. 3 deletes the function guides 30*c*, 30*d*, and 30*f*, and causes a breaker flow rate setting value 47 and an attachment flow rate setting value 48 to be displayed in that space as illustrated in FIG. 12. As a result, even in the construction machine other than the bulldozer 1, more pieces of construction machine information can be displayed when the construction machine is operated. Further, when the power save gauge 36 is displayed on the space of the function guides 30*c*, 30*d*, and 30*f*, any other construction machine information can be displayed on the space on which the power save gauge 36 has been empty.

The breaker flow rate setting value 47 and the attachment flow rate setting value 48 are included in the screen other than the standard screen, and when the values are displayed, the function switch 16 needs to be changed many times. When the construction machine information (the breaker flow rate setting value 47 and the attachment flow rate setting value 48 in this modified example) other than the construction machine information displayed on the standard screen is displayed at the position from which the function guides 30*c*, 30*d*, and 30*f* are deleted, desired construction machine information can be displayed on the display device 15 during an operation without a cumbersome switching operation of the function switch 16.

As described above, in the present embodiment and the modified example, when the construction machine is operated, a display of a function guide which needs not be displayed during an operation is deleted from the display device. As a result, other construction machine information, for example, construction machine information necessary when the construction machine is operated can be displayed at the position at which the function guide has been displayed. Since the position at which the function guide has been displayed is used, the size of an icon serving as a mark representing the construction machine information or the like needs not be reduced. As a result, more pieces of construction machine information necessary when the construction machine is operated can be displayed on the display device while securing visibility of the display device. Further, the worker can understand the construction machine information necessary when the construction machine is operated without taking his/her hands from the traveling operating lever and the working implement operating lever. Further, information of a function added by a model change of a construction machine can be displayed on the empty space generated by displaying other construction machine information at the position at which the function guide has been displayed. As a result, it is possible to easily cope with an increase in the amount of information to be displayed on the display device. The present embodiment and the modified example have been described regardless of the type of construction machine, but are particularly suitable for a construction machine, such as a bulldozer, in which many pieces of information are displayed on the display device such as a display of a vehicle speed or a display of information (for example, a mission oil temperature) related to transmission as well as a display of an engine water temperature and a fuel amount. Further, as an application target of the information display device and method of the construction machine and the computer program according to the present embodiment and the modified example, the construction machine is not limited to the bulldozer and the excavator, and may be, for example, a wheel loader or any other construction machine.

REFERENCE SIGNS LIST

1 BULLDOZER
1B VEHICLE BODY
2 TRAVELING DEVICE
5 ENGINE
6 TRANSMISSION
7 HYDRAULIC PUMP
9 BLADE
12 CAB
12S SEAT
12P OPERATION PEDAL
14 DASHBOARD
15 DISPLAY DEVICE
16, 16a, 16b, 16c, 16d, 16e, 16f FUNCTION SWITCH
17 TRAVELING OPERATING LEVER
18 WORKING IMPLEMENT OPERATING LEVER
20 CONTROL DEVICE
21 PROCESSING UNIT
22 STORAGE UNIT
23 I/O UNIT
24 COMMUNICATION LINE
25 TRAVELING CONTROL DEVICE
26 WORKING IMPLEMENT CONTROL DEVICE
27 ENGINE CONTROL DEVICE
28P PARKING BRAKE
28L WORKING IMPLEMENT LOCKING LEVER
29 VEHICLE SPEED SENSOR
30, 30a, 30b, 30c, 30d, 30e, 30f FUNCTION GUIDE
31 MULTI GAUGE
32 ENGINE WATER TEMPERATURE GAUGE
34 FUEL GAUGE
36 POWER SAVE GAUGE
39a, 39b FUNCTION DISPLAY ICON
39a' PULL GAUGE
40 VEHICLE SPEED GAUGE
41V ICON
44 MENU SCREEN
100 INFORMATION DISPLAY DEVICE

The invention claimed is:

1. An information display device of a construction machine, comprising:
a display device that is mounted in a construction machine and displays various types of information of the construction machine;
a display change-over switch for changing information displayed on the display device; and
a control device that displays at least information of a fuel amount and information of an engine water temperature in a screen of the display device and displays a guide mark guiding a function of the display change-over switch at a position corresponding to a position of the display change-over switch in the screen,
wherein the control device deletes a display of the guide mark when the construction machine is in an operation state,
wherein the control device causes information necessary when the construction machine is in the operation state to be displayed at a position of the deleted guide mark, and
wherein the information that is necessary when the construction machine is in the operation state and that is displayed at the position of the deleted guide mark is information that is not displayed in the display device before the display the guide mark is deleted.

2. The information display device of the construction machine according to claim 1,
wherein, when the display of the guide mark is deleted, an input to the display change-over switch is not received.

3. The information display device of the construction machine according to claim 2,
wherein information displayed at the position of the guide mark deleted by the control device is information allocated to a mark in which a plurality of types of information are changed by the display change-over switch to be displayed.

4. The information display device of the construction machine according to claim 1,
wherein, when an error occurs in the construction machine while the construction machine is being operated, the control device displays the guide mark representing the display change-over switch for switching to a screen displaying information of the error.

5. The information display device of the construction machine according to claim 1,
wherein, when the construction machine is not in the operation state, the control device causes the guide mark to be displayed on the display device.

6. The information display device of the construction machine according to claim 1,
wherein, when there is an input to an operating lever for operating the construction machine, the control device deletes the display of the guide mark.

7. The information display device of the construction machine according to claim 6,
wherein, when a state in which the operating lever is at a neutral position is maintained during a predetermined period of time or less, the control device deletes the display of the guide mark.

8. An information display device of a construction machine, comprising:
a display device that is mounted in a construction machine and displays various types of information of the construction machine;
a display change-over switch that changes information displayed on the display device; and
a control device that displays at least information of a fuel amount and information of an engine water temperature in a screen of the display device and displays a guide mark guiding a function of the display change-over switch at a position corresponding to a position of the display change-over switch in the screen,
wherein when the construction machine is in an operation state, the control device deletes a display of the guide mark which is displayed on an end portion of the screen of the display device and causes information necessary when the construction machine is in the operation state to be displayed at a position of the deleted guide mark, and when the construction machine is not in the operation state, the control device causes the guide mark to be displayed on the display device, and when an error occurs in the construction machine while the construction machine is being operated, the control device displays the guide mark representing the display change-over switch for switching to a screen displaying information of the error, wherein, when the display of the guide mark is deleted, an input to the display change-over switch is not received, and wherein the information that is necessary when the construction machine is in the operation state and that is displayed at the position of the deleted guide mark is information that is not displayed in the display device before the display the guide mark is deleted.

9. An information display method of a construction machine including a display device that is mounted in a construction machine and displays various types of information of the construction machine, and a display change-over switch for changing information displayed on the display device, the information display method comprising:

displaying at least information of a fuel amount and information of an engine water temperature in a screen of the display device and displaying a guide mark guiding a function of the display change-over switch at a position corresponding to a position of the display change-over switch in the screen;

determining whether or not a construction machine is in an operation state; and deleting a display of the guide mark when the construction machine is in the operation state; and displaying information necessary when the construction machine is in the operation state at a position of the deleted guide mark, wherein information that is necessary when the construction machine is in the operation state and that is displayed at a position of the deleted guide mark is information that is not displayed in the display device before the display the guide mark is deleted.

10. The information display method of the construction machine according to claim 9, wherein the display of the guide mark is deleted, an input to the display change-over switch is not received.

11. The information display method of the construction machine according to claim 9, wherein, when the construction machine is not in the operation state, the guide mark is displayed on the display device.

12. The information display method of the construction machine according to claim 9, wherein, when there is an input to an operating lever for operating the construction machine, the display of the guide mark is deleted.

13. The information display method of the construction machine according to claim 12, wherein, when a state in which the operating lever is at a neutral position is maintained during a predetermined period of time or less, the display of the guide mark is deleted.

14. A computer program product having a non-transitory computer readable medium including programmed instructions, wherein the instructions, when executed by a computer, cause the computer to perform:

displaying, on a display device that is mounted in a construction machine, various types of information of the construction machine, the display device having a display change-over switch for changing information displayed on the display device;

displaying at least information of a fuel amount and information of an engine water temperature in a screen of the display device and displaying a guide mark guiding a function of the display change-over switch at a position corresponding to a position of the display change-over switch in the screen;

determining whether or not a construction machine is in an operation state;

deleting a display of the guide mark when the construction machine is in the operation state; and displaying information necessary when the construction machine is in the operation state at a position of the deleted guide mark, wherein information that is necessary when the construction machine is in the operation state and that is displayed at a position of the deleted guide mark is information that is not displayed in the display device before the display the guide mark is deleted.

* * * * *